July 2, 1968     B. M. TILGHMAN ET AL     3,390,917
DECORATIVE ATTACHMENT FOR SPOKE WHEELS
Filed Aug. 30, 1966
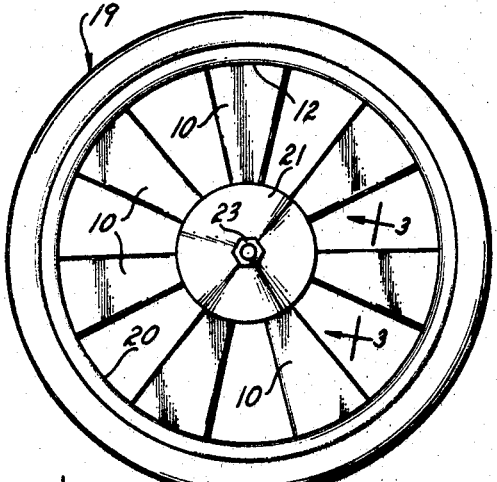
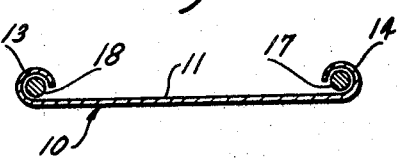
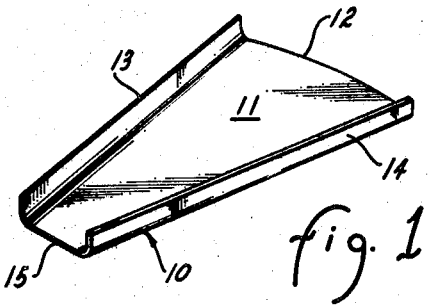
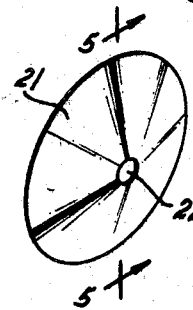
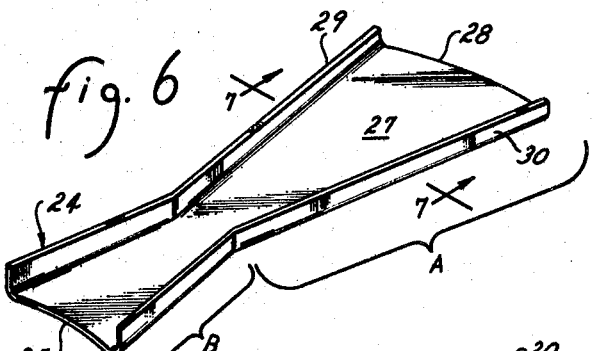
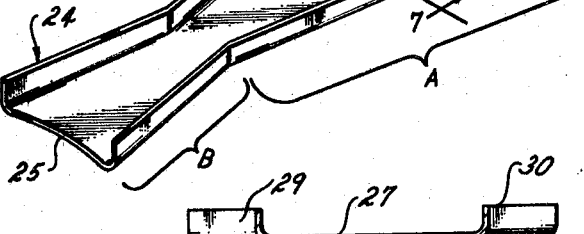
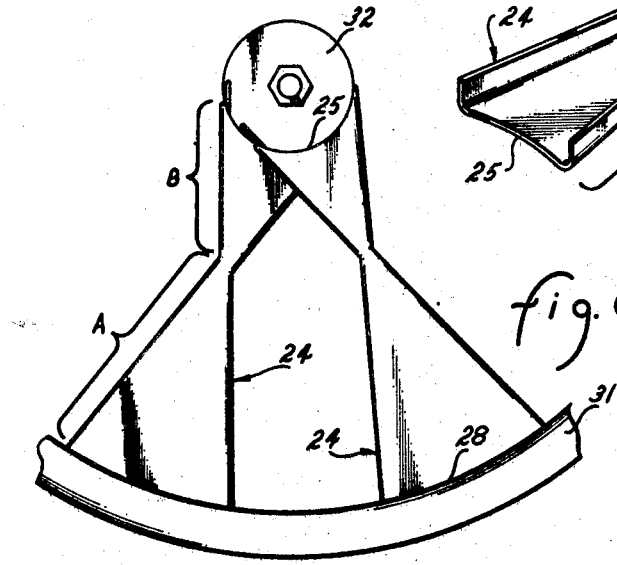
INVENTORS.
BILLY M. TILGHMAN
MYRON L. STEVENS
BY
Drummond & Cahill
ATTORNEYS United States Patent Office 3,390,917
Patented July 2, 1968

1

3,390,917
DECORATIVE ATTACHMENT FOR
SPOKE WHEELS
Billy M. Tilghman, 5002 W. Bethany Home Road, and
Myron L. Stevens, 5008 W. Flynn Lane, both of Glendale, Ariz. 85301
Filed Aug. 30, 1966, Ser. No. 576,110
2 Claims. (Cl. 301—37)

ABSTRACT OF THE DISCLOSURE

A decorative attachment for use on spoke-type wheels, comprising a plurality of separate panels to be attached between two spokes. The longitudinal edges of the panels are pliable to be deformed by finger pressure around the spokes to retain the panels in position without tending to displace the spokes.

---

This invention relates to spoke-type vehicle wheels.

More particularly, this invention concerns a new and decorative attachment for use on spoke-type wheels, comprising a plurality of panels to cover the spokes.

In a further aspect, the invention concerns a decorative attachment of the above-described type in which the panels may be conveniently attached without the aid of tools and, further, removed in an analogous manner.

In a still further aspect, the invention concerns such attachments wherein the decorative panels are joined to the spokes without bending, exerting pressure upon, or otherwise giving cause to injurious effects upon the spokes.

Decorative devices for spoke-type wheels are highly desired items by certain contingents of the population, predominant of which are the youngsters with bicycles. It is well known that youngsters are continually striving to imitate the adult generation. One such field of imitation embraces decorating bicycle wheels so as to simulate the "mag" type wheels used on racing cars and other sports vehicles.

Prior art devices for this purpose are generally of two types. One type comprises disk-like affairs applied to the opposite sides of the spokes and retained in position by a series of fasteners, bolts, or rivets extending laterally between the opposing disks. The other predominant type of prior art device consists of a series of panels which are fitted between the spokes and held in position by spring tension exerted upon the spokes.

The spokes of a wheel are capable of carrying heavy loads and exhibit great strength when positioned in a wheel under their normal stresses of tension and compression; however, spokes are exceedingly vulnerable to lateral forces. Any lateral force applied to a spoke will easily bend the spoke and result in misalignment of the wheel.

It would be highly advantageous, therefore, to provide an attachment for spoke-type wheels which could give the desired ornamental or decorative effect and concurrently assure that the spokes are not injured. Such an attachment should also be easily applied without the use of special tools or other equipment and, further, conveniently removed when desired.

Accordingly, it is a principal object of the present invention to provide a decorative attachment for spoke-type wheels which adds aesthetic value to the appearance of the wheel.

A further object of the invention is to provide a decorative attachment of the above type which can be conveniently installed without the aid of special tools or equipment.

2

A still further object of the invention is the provision of decorative attachments which encompass the spokes of vehicle wheels without exerting pressure upon, bending, or otherwise injuring the spokes.

These and other, further, and more specific objects and advantages of the present invention will become apparent from a detailed description of a preferred embodiment of the invention taken in conjunction with the drawing, in which:

FIG. 1 is a perspective view of a decorative panel for attachment to a spoke-type wheel chosen for purposes of illustration;

FIG. 2 is a side elevational view of a spoke wheel having attached thereto a series of the panels of FIG. 1;

FIG. 3 is a sectional view taken along the line 3—3 of FIG. 2 and shows the method of attachment of the decorative panels to the spokes;

FIG. 4 is a decorative center section and hub cover for use in conjunction with the assembly of FIG. 2;

FIG. 5 is a sectional view taken along the line 5—5 of FIG. 4 and illustrates a desired cross-sectional configuration;

FIG. 6 is a perspective view illustrating a second type of decorative panel which is a modification of FIG. 1;

FIG. 7 is a sectional view along the line 7—7 of FIG. 6 and illustrates the partly preformed spoke attaching lips; and FIG. 8 is a fragmentary side elevational view showing the decorative panel of FIG. 6 as it might appear when attached to the rear wheel of a bicycle or the like.

Briefly, in accordance with my invention, I provide a series of elongate malleable panels having convergent longitudinal sides which are coincident with the spokes of a wheel. Integral with the panels and extending along the longitudinal sides thereof are lips sufficiently pliable to be deformed by finger pressure to encompass the spokes. By applying the panels to the spokes in the above manner, it will become readily apparent to those skilled in the art that no forces of deformation are applied to the spokes. The outer edges of the aforementioned panels have a curvature which substantially approximates and abuts the rim of the wheel to give the appearance that the panels are integral to the rim.

Also provided is a decorative center section cover which encloses the hub and extends radially outward to encompass the inner edges of the aforementioned decorative panels.

Turning now to the drawing, attention is first directed to FIG. 1 which illustrates one of the preferred decorative panels as it would appear prior to installation upon the spokes of the wheel. The panel 10 consists of a substantially flat center section 11 having an arcuate end 12. Extending convergently along the longitudinal edges of the panel 10 are lips 13 and 14. As noted, the lips 13 and 14 are partially deformed to aid in the ease of installation, as illustrated in FIGS. 2 and 3. By applying finger pressure to the highly pliable lips 13 and 14, the lips may be further deformed to encompass the spokes 17 and 18, as shown in FIG. 3.

When applied to the spoked wheel 19 of FIG. 2 in the manner described above, the arcuate edge 12 of the panel 10 abuts the rim 20 of the wheel 19. The panels 10 now extend radially inward toward the axis of the wheel wherein the innermost edge 15 of the panels 10 are encompassed by a decorative center cover 21. The cover 21, as illustrated in FIG. 4, has a central aperture 22 through which may pass the axle of the wheel 19. FIG. 5 illustrates the conical cross section of the cover 21. It should be obvious to those skilled in the art that the particular cross section of the cover 21 allows substantial retention thereof against the panels 10. The cover 21 is retained in this position by the cone-locking nut 23.

Some types of spoke wheels, for example, the rear wheel of a bicycle, have a complex hub housing mechanical assemblages, parts of which protrude from said hub making the use of the aforementioned center cover 21 impossible. For this type of spoked wheel, a modification of the spoke-covering panel must be employed. A preferred embodiment of this type of panel is illustrated in FIG. 6 wherein an alternate panel 24 is shown. The alternate panel 24 is analogous to the panel 10 in that it comprises a substantially flat center section 27, an arcuate lower edge 28, and locking lips 29 and 30 extending along the longitudinal edges thereof. The panel 24 has sides which converge from the edge 28 in the area designated as A, then diverge in the area designated as B. It should be obvious to those skilled in the art that this first convergent, then divergent pattern of the edges of the panel 24 correspond to the normal criss-cross pattern common to spokes.

As illustrated in FIG. 7, the locking lips 29 and 30 are partially preformed for ease of installation as described earlier in connection with the installation of panel 10.

Attention is now directed to FIG. 8 wherein the panels 24 are illustrated as applied to the rear wheel of a bicycle. The arcuate outer edge 28 of the panel 24 abuts the bicycle rim 31 while the inner concave edge 25 thereof follows the contour of the enlarged hub 32.

It should be readily understood from the foregoing detailed description of the drawing that if the panels 10 and 24 are constructed from a malleable material such as copper or aluminum, the desired objectives of the invention may be achieved. The locking lips, as previously described, may be folded over the spokes by mere finger pressure without exerting any force upon the spokes. The convergent pattern of the spokes and the corresponding shape of the panels thereof will be sufficient to prevent movement of the panels after being so positioned. Various decorative effects may be achieved by anodizing, burnishing, mill marking, or other surface treatment of the panels.

Various changes in the device herein chosen for purposes of illustration will readily occur to persons skilled in the art. Such modifications and variations, while not explicitly denoted in the foregoing detailed specification, do not deviate from the teachings of the present invention and are intended to be included in the scope and spirit thereof which is limited only by fair interpretation of the following claims.

Having fully described and disclosed my invention and the presently preferred embodiments thereof in such a manner as to enable those skilled in the art to understand and practice the same.

We claim:
1. A wheel combination comprising:
 (a) a spoke wheel including
  a hub,
  a rim, and
  spaced spokes extending radially between and secured to said hub and said rim;
 (b) a plurality of decorative wheel cover sections, each said section comprising:
  an elongate panel extending inwardly from the rim a substantial distance toward the hub of semi-rigid material deformable by finger pressure, said panel having opposed side edges congruent with a pair of said spaced spokes, and
  attaching lips extending substantially continuously longitudinally along said side edges, each said lip being sufficiently pliable to be deformed by finger pressure to enclose a spoke of said wheel and thereby retain said section in its proper decorative position without substantial tendency to displace said spaced spokes from their normal position.

2. A decorative wheel cover combination for use in combination with a spoke wheel having a rim, a hub, and spaced spokes extending radially between and secured to the hub and the rim, said decorative wheel cover combination comprising:
 (a) a plurality of elongate panels of semi-rigid material deformable by finger pressure, each said panel having
  opposed side edges congruent with a pair of said spaced spokes, and
  attaching lips extending substantially continuously longitudinally along said side edges, each said lip being sufficiently pliable to be deformed to encompass a spoke of said wheel and thereby retain said wheel panel in its proper respective position without substantial tendency to displace said spaced spokes from their normal position;
 (b) a decorative hub cover comprising a disk having a central aperture, an outer periphery encompassing the central section of said spokes, and being in retention against the said decorative spoke panels.

References Cited
UNITED STATES PATENTS

| | | | |
|---|---|---|---|
| D. 88,975 | 1/1933 | Majewicz | 301—37 |
| 680,224 | 8/1901 | Camp | 301—37 |
| 1,878,528 | 9/1932 | Kraeft | 301—37 X |
| 2,344,542 | 3/1944 | Fike | 301—37 X |
| 2,754,154 | 7/1956 | Solow | 301—37 X |
| 3,082,041 | 3/1963 | Hamilton | 301—37 |
| 1,510,048 | 9/1924 | Evans | 301—37 |
| 3,034,833 | 5/1962 | Ares | 301—37 |
| 3,141,704 | 7/1964 | Guingrich | 301—37 |

RICHARD J. JOHNSON, *Primary Examiner.*